G. RICHARDS.
MILLING SCREW THREADS.
APPLICATION FILED MAR. 30, 1920.
1,365,954.
Patented Jan. 18, 1921.
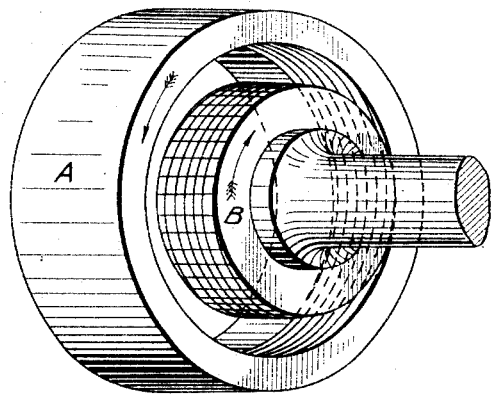
INVENTOR$.
George Richards

UNITED STATES PATENT OFFICE.

GEORGE RICHARDS, OF WESTMINSTER, LONDON, ENGLAND, ASSIGNOR TO THE RICHARDS THREAD MILLING MACHINE COMPANY, (1918) LIMITED, OF LONDON, ENGLAND.

MILLING SCREW-THREADS.

1,365,954.      Specification of Letters Patent.     Patented Jan. 18, 1921.

Application filed March 30, 1920. Serial No. 369,848.

*To all whom it may concern:*

Be it known that I, GEORGE RICHARDS, a citizen of the United States, residing at The Outer Temple, 222 Strand, in the city of Westminster, London, England, have invented new and useful Improvements in Milling Screw-Threads, of which the following is a specification.

This invention relates to improved means applicable for use in milling screw-threads with the aid of rotary cutters of the "hob" type; that is to say, cutters having teeth which follow the line of a screw-thread of the same pitch as that of the thread to be cut; the cutter and the work-piece revolving at the same rotative speed, but neither partaking of any movement in an axial direction; my present improvements being more particularly advantageous in screw-threading internal surfaces.

In the specification to British Letters Patent granted to me and William Worby Beaumont and dated the 18th October, 1916, No. 110395, is described the employment of a hob for threading internal surfaces; the hob revolving in the same direction as the work-piece. Under such conditions of working, it is necessary to rotate both the hob and the work-piece at a comparatively high speed in order to obtain the desired cutting speed, the latter being represented by the difference between the peripheral speeds of the contacting surfaces of the respective bodies.

Means applicable for use in cutting internal screw-threads according to my improved method of working are illustrated in the accompanying drawings; A representing the work-piece and B the hob. Assuming the latter to rotate clock-wise, the former revolves in the opposite direction, but at the same rotative speed. Assuming also that the work-piece is to be cut with a right-handed thread, the cutting teeth of the hob follow left-handed threads. Under such conditions, the speed of the teeth when cutting an internal thread is obviously the sum of the speeds of the contacting surfaces between the two bodies, instead of the difference between their speeds, as described in the aforesaid previous specification.

Although I have described my invention with reference to cutting an internal screw-thread, it will be obvious that it is equally applicable in cutting external threads; although in that case, the hob and the work piece would revolve in opposite directions, and the cutting speed of the teeth would not be the sum of, but the difference between, their peripheral speeds.

I claim:—

In milling screw-threads, the employment of a hob formed with cutting teeth which follow spiral threads of the reverse hand to that of the thread to be cut, the hob and the work-piece revolving in opposite directions.

GEORGE RICHARDS.